US 8,693,977 B2

(12) United States Patent
Patnaik et al.

(10) Patent No.: US 8,693,977 B2
(45) Date of Patent: Apr. 8, 2014

(54) TECHNIQUES FOR PERSONAL SECURITY VIA MOBILE DEVICES

(75) Inventors: Sandeep Patnaik, Bangalore (IN); Saheednanda Singh, Thoudam (IN); AnilKumar Bolleni, Bangalore (IN)

(73) Assignee: Novell, Inc., Provo, UT (US)

( * ) Notice: Subject to any disclaimer, the term of this patent is extended or adjusted under 35 U.S.C. 154(b) by 633 days.

(21) Appl. No.: 12/541,006

(22) Filed: Aug. 13, 2009

(65) Prior Publication Data

US 2011/0039514 A1    Feb. 17, 2011

(51) Int. Cl.
*H04M 11/04*    (2006.01)
*H04M 1/00*    (2006.01)
*H04M 3/42*    (2006.01)
*G10L 15/00*    (2013.01)

(52) U.S. Cl.
USPC ............... 455/404.1; 455/404.2; 455/556.1; 455/411; 455/414.2; 704/E15.001; 704/231

(58) Field of Classification Search
USPC ............ 455/404.1, 404.2, 556.1, 411, 414.2; 704/E15.001, 231
See application file for complete search history.

(56) References Cited

U.S. PATENT DOCUMENTS

| | | | |
|---|---|---|---|
| 6,263,190 B1 | 7/2001 | Mamori et al. | |
| 7,158,026 B2 | 1/2007 | Feldkamp et al. | |
| 7,536,562 B2 | 5/2009 | Little et al. | |
| 2003/0210683 A1 * | 11/2003 | Bais et al. | 370/352 |
| 2005/0096067 A1 * | 5/2005 | Martin | 455/456.1 |
| 2006/0201964 A1 * | 9/2006 | DiPerna et al. | 222/78 |
| 2007/0189246 A1 * | 8/2007 | Molnar | 370/338 |
| 2007/0298767 A1 | 12/2007 | Brown et al. | |
| 2008/0005561 A1 | 1/2008 | Brown et al. | |
| 2008/0009264 A1 | 1/2008 | Brown et al. | |
| 2008/0102785 A1 * | 5/2008 | Childress et al. | 455/404.1 |
| 2009/0011796 A1 | 1/2009 | Ormson | |
| 2009/0093233 A1 | 4/2009 | Chitlur | |

* cited by examiner

*Primary Examiner* — Ariel Balaoing
(74) *Attorney, Agent, or Firm* — Schwegman Lundberg & Woessner, P.A.

(57) ABSTRACT

Techniques for achieving personal security via mobile devices are presented. A portable mobile communication device, such as a phone or a personal digital assistant (PDA), is equipped with geographic positioning capabilities and is equipped with audio and visual devices. A panic mode of operation can be automatically detected in which real time audio and video for an environment surrounding the portable communication device are captured along with a geographic location for the portable communication device. This information is streamed over the Internet to a secure site where it can be viewed in real time and/or later inspected.

6 Claims, 3 Drawing Sheets

TECHNIQUES FOR PERSONAL SECURITY VIA MOBILE DEVICES

BACKGROUND

Increasingly individuals are obtaining and using cell phones for security reasons. For instance, when a car breaks down or when an emergency occurs individuals often use their cell phones to make calls and report the incident to loved ones or to the authorities. Consider the notable Sep. 11, 2001 ("9/11") plane crashes and hijackings, which resulted in passengers aboard one of the downed planes calling 911, other emergency numbers, and loved ones to report in real time what was occurring aboard the plane.

However, to use a mobile device in a crisis situation, the operator has to manually make a phone call, manually snap a picture, and/or take a video. If the situation is hostile then it will be obvious what the operator is doing or attempting to do; this can escalate the situation and may even put the operator in grave danger with his/her captors.

Furthermore, if the operator is unable to communicate where he/she is physically located, then finding the crisis location can be trying if not impossible. Assuming authorities were called and the call lasted long enough, the authorities may be able to triangulate the position of the cell phone using 3 or more cell towers in the vicinity of the operator. If authorities were not contacted or if authorities were not on the call long enough to triangulate the position, then locating the physical position of the crisis can be challenging guess work. All this uncertainty is likely occurring while a crisis situation unfolds and in a circumstance where "time is of the essence."

Cell phones were made with personal communication in mind and were not made with the primary intent of providing personal security. Consequently, cell phones lack many security features. This is still largely the case even when the general public has turned to cell phone communications for security in many high-profile situations, such as 9/11 and others.

Thus, what are needed are improved techniques for achieving personal security via mobile devices.

SUMMARY

In various embodiments, techniques for personal security via mobile devices are presented. More specifically, and in an embodiment, a method facilitating personal security via a mobile device is provided. That is, a request for a panic mode of operation is detected, the panic mode of operation is a mode that a portable communication device is to transition to. Next, an Internet connection is established in response to the request for the panic mode of operation and multimedia devices on the portable communication device are activated to record multimedia data for an environment that the portable communication device is currently in. Also, a physical position (geographic position/location) for the portable communication device is acquired and the recorded multimedia data and the physical position are streamed from the portable communication device over the Internet to a secure remote storage location for subsequent viewing and inspection.

DETAILED DESCRIPTION

As used herein a "mobile device" refers a portable communication device used by a person (user or operator). The mobile device is used for audio, text, and/or visual communication over one or more wireless communication networks. An example mobile device includes a cell phone, a PDA, a laptop, etc.

According to an embodiment, the techniques presented herein are implemented as software products configured on cell phones for providing enhanced personal security of the cell phone operators.

Of course, the embodiments of the invention can also be implemented in a variety of mobile communication devices. Any particular architectural layout or implementation presented herein is provided for purposes of illustration and comprehension only and is not intended to limit various aspects of the invention.

Figure 3:
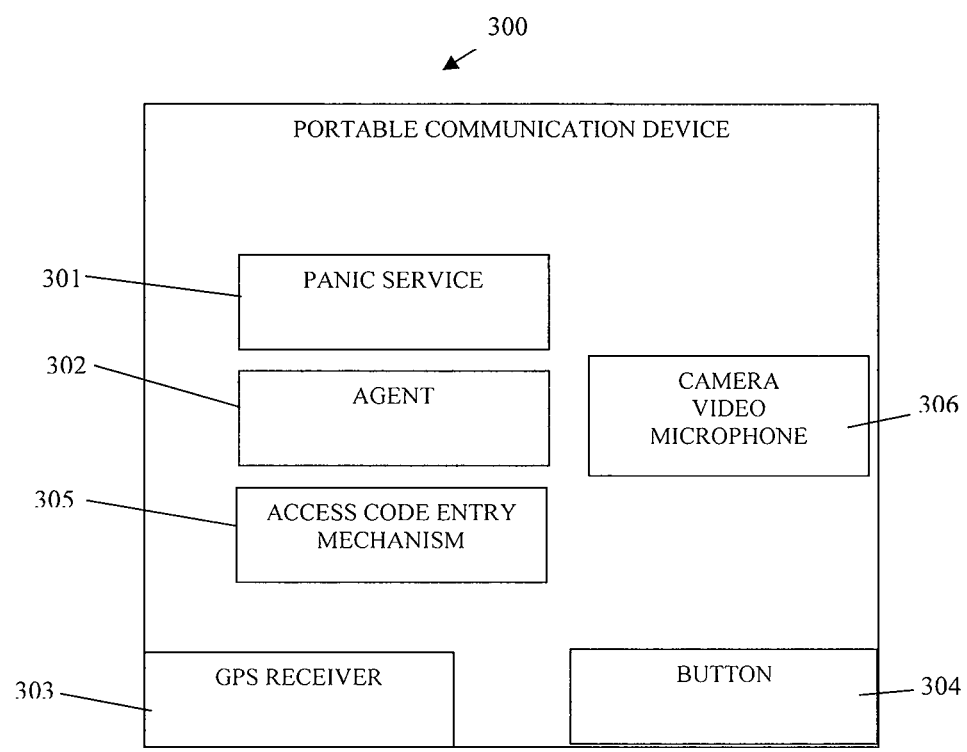
FIG. 3 is a diagram of a personal security mobile device, according to an example embodiment.

It is within this initial context, that various embodiments of the invention are now presented with reference to the FIGS. 1C3.

Figure 1:
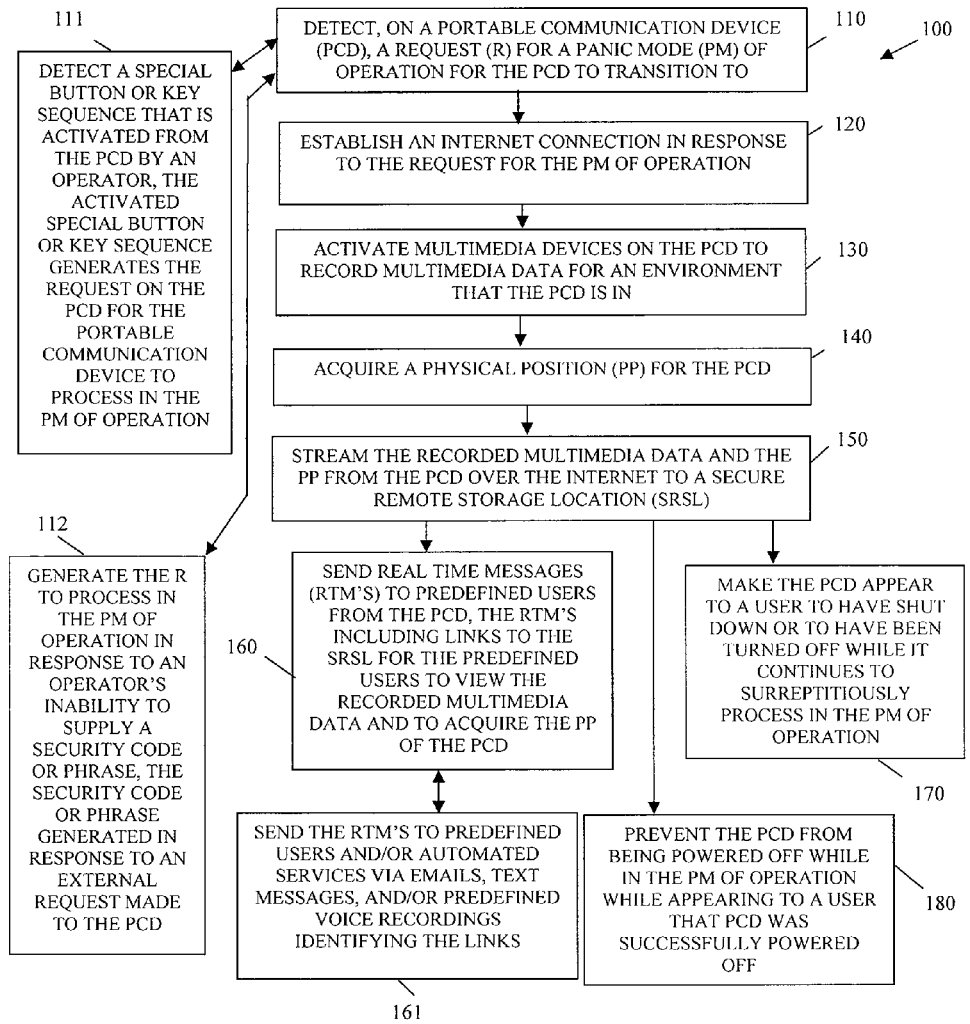
FIG. 1 is a diagram of a method for facilitating personal security via a mobile device, according to an example embodiment.

FIG. 1 is a diagram of a method 100 for facilitating personal security via a mobile device, according to an example embodiment. The method 100 (hereinafter "server-mode mobile device service") is implemented as instructions in a machine-accessible and computer-readable medium. The instructions when executed by a machine (processing device, computer, cell phone, personal digital assistant (PDA), etc.) perform the processing depicted in FIG. 1. The server-mode mobile device service is also operational over and processes within a wireless communication network.

In an embodiment, the server-mode mobile device service is implemented and is integrated within a cell phone or PDA of a user/operator.

At 110, the server-mode mobile device service detects a request for the mobile device (also referred to herein as a "portable communication device") to enter a panic mode of operation. This request is for the mobile device to automatically and dynamically transition itself to the panic mode of operation. Detection of the request for the panic mode of operation can occur in a variety of manners.

For example, at 111, the server-mode mobile device service detects that a special key sequence was entered by an operator of the personal communication device. It may also be that the server-mode mobile device service detects that a special button on the personal communication device was activated by the operator. This generates the request on the personal communication device when the key sequence is entered or the specially manufactured panic button is activated and that request for the panic mode is dynamically detected by the server-mode mobile device service. In some cases, a standard built-in button on the personal communication device that is used for other purposes, such as camera, etc. can be altered so if it is pressed and held or pressed in rapid succession for a configured number of iterations, the panic mode request can be generated and detected by the server-mode mobile device service.

In another instance, at 112, the server-mode mobile device service generates the request to process the panic mode of operation in response to an operator's inability to supply a requested security code or security phrase. This can be generated by an external requested that is made to the personal communication device. So, if a phone is stolen, the owner of the phone could send a message (text, email, or even a call) that is received by the phone and causes the server-mode mobile device service to request the operator enter a security code or phrase, when a pre-configured of iterations result in an inability of the operator to supply the security information, the server-mode mobile device service generates the panic mode request. In another instance, it may be a third-party known to the operator sends a request to get a live feed and perhaps geographic location of the operator/owner. Should the operator/owner properly enter the security information, then the operator/owner can deny the request, limit the request to specific information, or allow the request. But, if the operator/owner is unable to enter the security information it can mean something is going awry with the owner/operator and the server-mode mobile device service can automatically generate the panic mode request.

At 120, the server-mode mobile device service establishes an Internet connection in response to the request for the panic mode of operation. The server-mode mobile device service establishes a network connection in response to the panic mode of operation, this is to upload a variety of information and real-time video and/audio to a secure website or location that is external to the personal communication device.

At 130, the server-mode mobile device service activates multimedia services on the personal communication device to record in real time and dynamically multimedia data from an environment of the personal communication device. That is, real-time audio and/or video of the physical surrounds of the personal communication device are recorded.

Additionally, at 140, the server-mode mobile device service acquires the physical and geographical position for the personal communication device while the real-time multimedia data is being recorded.

Next, at 150, the server-mode mobile device service dynamically and in real-time streams the recorded multimedia data and the physical position(s) (multi positions can be streamed as over the time while the personal communication device is operating in the panic mode the personal communication device may be physically traveling while in the possession of the owner/operator) to the secure and remote storage location over the network connection and external to the personal communication device.

According to an embodiment, at 160, the server-mode mobile device service sends one or more real-time messages to predefined users from the personal communication device. The real-time messages can include links to the secure and remote storage location for the predefined users to view the recorded multimedia data and the physical position(s) of the personal communication devices. Here, the predefined users may or may not be required to authenticate themselves before being able to access the secure and remote storage location. Access to the storage location does not permit the predefined users to alter and/or remove the physical positions and the multimedia data.

Additionally, in some cases, the recorded multimedia data may include calendar dates and times with each frame sequence reflecting exactly when the multimedia data and the physical positions were captured. This permits a subsequent forensic analysis to occur on the multimedia data and the physical position(s) assuming some type of crime has taken place. However, it is not always a crime that may have taken place as individuals may want to enter a panic mode and record what is transpiring even when a situation with the owner/operator is not hostile, such as in martial disagreements, disputes between parties, etc.

Continuing with the embodiment at 160 and at 161, the server-mode mobile device service can send the real-time messages to predefined users and/or automated services via emails, text messages, and/or pre-recorded voice recordings identifying the links. Automated services may notify authorities and provide detail information.

In another case, at 170, the server-mode mobile device service can make the personal communication device appear to a user to have shut down or to have been powered off while it continues to surreptitiously process in the panic mode of operation and record the multimedia data and physical position(s) of the personal communication devices. This feature can be especially beneficial if the personal communication device falls into the hands of a criminal because the criminal may believe the device is off. In some cases, the device can continue to operate so as to also trick the person in possession of it all the while it continues to record and upload the multimedia data and the physical position(s) of the personal communication device to the secure and remote storage location.

According to an embodiment, at 180, the server-mode mobile device service prevents the personal communication device from being powered off while in the panic mode of operation. Here, only removal of the battery can end the panic mode of operation. But, the server-mode mobile device service can make the possessor of the personal communication device believe that he/she has successfully powered off the device. Again, the possessor believes the device is off when it remains on and continues to record and transmit the data and positions.

The predefined users can then access the links and get a real-time feed of what is visually and audibly occurring with the physical environment that is surrounding the personal communication device. Moreover, the physical and geographical position(s) of the device can be acquired. The geographical position can be mapped to cartographic data so the users can see street addresses or locations on a map visually in addition to specific coordinates.

Figure 2:
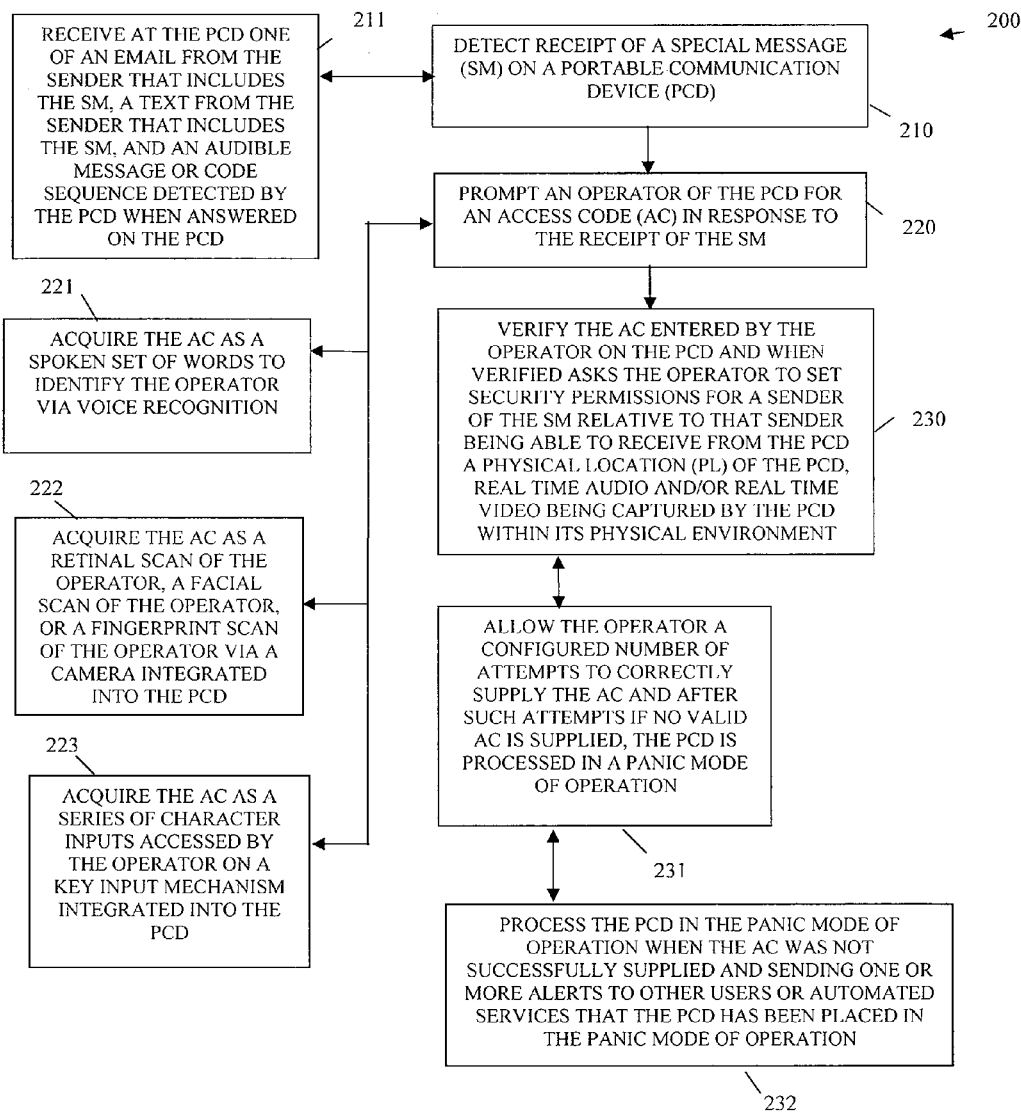
FIG. 2 is a diagram of another method for facilitating personal security via a mobile device, according to an example embodiment.

FIG. 2 is a diagram of another method 200 for facilitating personal security via a mobile device, according to an example embodiment. The method 200 (herein after referred to as "client-mode mobile device service") is implemented in and resides within a machine-accessible and computer-readable medium as instructions, which when accessed by a machine (one or more processors, cell phone, PDA, etc.) performs the processing depicted in the FIG. 2. The client-mode mobile device service is also operational over a wireless communication network.

The client-mode mobile device service represents a different processing mode for a mobile device from that which was presented above with respect to the server-mode mobile device service represented by the method 100 of the FIG. 1.

At 210, the client-mode mobile device service detects receipt of a special message on a portable communication device. This is done in an automated, dynamic, and real-time manner without any manual or human intervention whatsoever.

In an embodiment, at 211, the receipt is received at the personal communication device as one of an email from the sender that includes the special message, a text message from the sender that includes the special message, and/or an audible message or code sequence detected by the personal communication device when a call (associated with the audible message or code) is answered by the personal communication device.

The special message is received externally from the personal communication device and unlike the processing discussed with respect to the method 100 of the FIG. 1; the special message is not originated from the personal communication device.

At 220, the client-mode mobile device service prompts an operator of the personal communication device for an access code in response to the detected receipt of the special message.

In an embodiment, at 221, the client-mode mobile device service acquires the access code as a spoken set of words to identify the operator via voice recognition. In fact, the client-mode mobile device service may generate a random phrase that the operator is to repeat or a set phrase known only to the operator may have to be spoken into the personal communication device's microphone.

In another case, at 222, the client-mode mobile device service acquires the access code as a retinal scan of the operator, a facial scan of the operator, and/or a fingerprint scan of the operator. The images associated with this information can be captured via a camera associated with the personal communication device, the camera integrated into the personal communication device.

In still another situation, at 223, the client-mode mobile device service acquires the access code as a series of character inputs accessed by the operator on key input mechanism integrated into the personal communication device, such as a keypad or a touch screen keypad.

At 230, the client-mode mobile device service verifies the access code entered by the operator on the personal communication device and when verified asks the operator to set security permissions for a sender of the special message relative to that sender being able to received from the personal communication device real-time audio, video, and/or physical position(s) for the personal communication device's physical environment. The operator can deny details about physical position, audio, and/or video. The operator can also grant access to the physical position details, audio, and/or video. The control is given to the operator to set the security of access to all, some, or none of this information.

According to an embodiment, at 231, the client-mode mobile device service is allows the operator a configurable number of attempts to correctly supply the access code and after such attempts if no valid and verified access code is supplied, then the client-mode mobile device service places the personal communication device in a panic mode of operation.

Continuing with the embodiment of 231 and at 232, the client-mode mobile device service processes the personal communication device in the panic mode of operation when the access code was not successfully supplied. The client-mode mobile device service then sends one or more alerts to other users or automated services that the personal communication device has entered and been placed in panic mode of operation. The details and features associated with the panic mode of operation were described in detail above with reference to the method 100 of the FIG. 1.

It is noted that in some cases, legitimate access to the audio, video, and/or physical position may be desired. For instance, the operator may want to telecast an event to multiple friends via a website that the personal communication device is transmitting to. So, not all cases are emergency situations and some may be purely for leisure of the operator and the authorized users.

FIG. 3 is a diagram of a personal security mobile device 300, according to an example embodiment. The personal security mobile device 300 is implemented as a communication device having instructions configured to process on the personal security mobile device 300 and provides personal security for an operator/user of the personal security mobile device 300. The personal security mobile device 300 is also operational over a wireless communication network.

In an embodiment, the personal security mobile device 300 includes instructions for processing the methods 100 and 200 of the FIGS. 1 and 2, respectively.

The personal security mobile device 300 includes a panic service 301 and an agent 302. The personal security mobile device 300 (personal communication device 300) can also include a Global Satellite Positioning (GPS) receiver 303, a panic button 304, an access code entry mechanism 305 and an integrated camera, video, and microphone (collectively associated with 307). Each of these components and their interactions with one another will now be discussed in turn.

The panic service 301 is implemented in a computer-readable medium and executes on one or more processors of the portable communication device 300. Example processing associated with the panic service 301 was provided in detail above with reference to the methods 100 and 200 of the FIGS. 1 and 2, respectively.

The panic service 301 acquires the physical position of the portable communication device 300 activates an audio device and a video device 307 of the portable communication device 300. This is done to capture real time physical positions (via the GPS receiver 303), real time audio, and real time video from the portable communication device 300 when the portable communication device is processing in a panic mode of operation or in an operator authorized transmission mode as described above with reference to the method 200 of the FIG. 2.

The agent 302 is implemented in a computer-readable medium and also executes within the one or more processors of the portable communication device 300. Example aspects of the agent 302 were also described above with reference to the methods 100 and 200 of the FIGS. 1 and 2, respectively.

The agent 302 activates the panic mode of operation based on detected and evaluated events and/or messages occurring and received on the portable communication device 300 and initiates the panic service 301 on the personal communication device 300.

According to an embodiment, the personal communication device 300 also includes a GPS receiver 303 that is integrated into the portable communication device 300 and interfaced to the panic service 301 to supply the real time physical positions of the portable communication device 300. Again, the physical positions can be mapped to cartographic data and/or supplied as geographical coordinates. In some military embodiments, the physical position can trigger real-time satellites to try and capture independent visual inspection of the area surrounding the physical position. So, an undercover agent in distress or killed can have the panic service 301 activated (portable communication device 300 can appear to be powered off—activated remotely or by the agent) and the real-time physical position details of the portable communication device 300 sent to an automated service that triggers real time satellite video of the vicinity of the personal communication device 300 or a drone plane activated to go to the vicinity and take photographs, videos, and/or take aggressive military action.

In another case, the portable communication device 300 includes a hidden button 304 that when activated by an operator triggers the agent 302 to process the panic service 301 on the portable communication device 300. The hidden button 304 can be under a flap or protective cover that when opened can be intentionally activated (pressed) by the operator.

According to an embodiment, the portable communication device 300 includes an access code entry mechanism 305 integrated into the portable communication device 300 and interacted with by an operator of the portable communication device 300 to supply an access code that permits an external mobile requestor to view real time audio and real time video of the portable communication device 300 and to view a current physical position of the portable communication device 300. The agent 302 verifies the access code and permits the operator to set access restrictions on the requestor or deny the requestor access altogether.

In yet another embodiment, the access code entry mechanism 305 is a key input device for receiving key sequences from the operator, or a camera 306 integrated into the portable communication device for receiving retinal scans, facial scans, and/or fingerprint scans of the operator, the key sequences and the scans represent the access code supplied by the operator via the access code entry mechanism 305.

According to an embodiment, the portable communication device 300 is a cellular phone, a WiFi-enabled phone, and/or a satellite phone.

Some example situations and features of the embodiments presented herein and above are now described for further illustration.

When the personal communication device is in a panic mode of operation operators have a hand held GPS enabled mobile device (personal communication device) and this device can have a silent panic button, an Intelligent Agent (IA), and built-in camera. Whenever the device holder is in trouble, he/she presses the panic button. Once he/she presses the button, the IA application installed in that hand held device sends out emails, short messages, and/or makes calls to pre-configured contact persons/services and then provides a way to view the live video of what is actually happening and at the same time, the application starts uploading the video plus audio data. The location of this information is uploaded to pre-configured network storage, which is in a safe and secure place from the attackers. In this way, the uploaded data can be used for further investigation and identification of the victims. Also, in this mode switch off of the device is not permitted unless some security code, which is defined by user is provided. All the calls made when panic button is activated can also be redirected to the predefined number or conferenced to the predefined number if the operator (criminal) is attempting to make a different call.

During normal conditions of the personal communication device, parents and other friends can track any person who is holding the device if the person so permits. This means that communication can be started from the other side as well (via the family or friends of the device operator). When parents or other friends want to track the person, who is holding the device, they can just send a specially flagged mail or message or call. Once the mail or message is delivered to the device holder, device holder is forced to send a valid reply, a form of key combination and known only between the parties. The device holder can give only the location information or only the video or both and can also reject the request. These are done only through the specifically coded responses. If the device is snatched by the another person/culprit and the culprit replies with invalid keys, then a default action, for example initiating a panic condition or configured profile is taken after certain number of invalid key responses. This way, chances of identifying the unintended device holder is pretty high.

In embodiments presented herein, the personal communication device includes: an integrated camera/web camera used for recording audio and video; a GPS used for generating the location information (physical position); a silent panic/alarm button used when the device holder is in panic situation—the device holder presses this button when he/she is in panic and need help from other friends and contacts; a cellular/wireless network connection used for making calls to other mobiles and for uploading data in a storage located remotely and securely over the Internet: optionally a mail client used for sending mails; and an IA installed on the personal communication device used for tracking the location and surroundings of personal communication device. The IA has two operating modes: a server mode (described with reference to the method 100 of the FIG. 1) and a client mode (described with reference to the method 200 of the FIG. 2.

The server mode is activated by pressing the panic button and when it receives request from IA of other mobile devices remotely. When the panic button is pressed, this application activates the built-in camera, microphone and the Internet connection. Then the IA starts recording the video, audio and gets the location information from GPS and uploads these data in the storage located remotely over the Internet. At the same time, the IA starts sending specially flagged notification/invitations in the form of SMS or mail or mobile calls. Once confirmations are received from the IA, operating in a client mode it starts telecasting the live audio and video, which the camera has been recording and it also gives the location of the stored data in Internet.

This also allows the user to generate encrypted codes based on certain combination of characters/string(s). These strings are used as a response of a request coming from the IA operating in a client mode.

Whenever a request comes from a remote device, the operator has to reply by typing the string. The IA takes that input and generates an encrypted code and compares with the previously stored codes. If it does not match with any of the encrypted codes, it asks for a valid response/string again. When the number of wrong/invalid string entries reaches a pre-configured certain number of attempts, the IA takes a default action, which could be to place the device in a panic mode of operation. This gives the remote device, which is associated with a person who is tracking the device a chance to know who is holding the device.

During a client mode of operation, a remote device sends a request recognized by the IA of the personal communication device. This request is to make the service mode of the IA reply with a valid response or else a default action is taken, when an invalid response is given by the device holder.

An example processing flow of the two modes of operation are as follows. Given below the typical flow of the operation with two scenarios/conditions.

When the device holder in panic:
i. He/She presses a panic button and the IA in the device is activated to operate in server mode and do the following.
a. Switch on the built-in camera and microphone and start recording video, collecting location information using a GPS receiver and at the same time store/upload these data in the pre-configured local and/or network storage device in a remote network location.
b. At the same time the IA also searches a list of pre-configured contacts and sends out the notifications to them in the form of email or SMS (specially flagged for sure delivery, response and to wake up IA) and wait for the recipient's acceptance to accept a multicast (video telecasting) invitation to see the video and location information. In a case of calls, it plays the pre-recorded voice and asks to accept the invitation to intercept the live video.
c. Once any recipient accepts the invitation, live video stream along with the location information is telecast. At this point, the personal communication device is acting like a live video and location broadcaster. Recipients can now start tracking the sender. Recipients, with correct credentials, can also access the stored video and location data stored in the network/Internet storage for further investigation.

Under normal conditions-when any friends or parent/family want to track the Device holder:
  i. Using the IA, operated in a client mode, a remote user sends specially flagged (for sure delivery, response and wake up of the IA request in the form of email or SMS or call to the IA of personal communication device for accessing the device holder's location and video of its whereabouts.
  ii. The device holder receives the request and responds with some valid string and accordingly friends/parents get the desired data.
  iii. If the device holder presses wrong key, as a response, the server IA again ask for a correct response. The device holder's IA records the number of wrong keys pressed to detect an invalid operator of the personal communication device. When a pre-configured number of invalid keys entered are reached, the IA automatically triggers a default action, such as allowing that specific client to access live video and location information with appropriate message.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A portable communication device, comprising:
   a panic service implemented in a computer-readable medium and to execute on one or more processors of the portable communication device; and
   an agent implemented in a computer-readable medium and to execute within the one or more processors of the portable communication device; wherein panic service is acquire the physical position of the portable communication device and is to activate an audio device and a video device of the portable communication device to capture real time physical positions, real time audio, and real time video from the portable communication device when the portable communication device is processing in a panic mode of operation, the agent is to activate the panic mode of operation based on detected and evaluated events and/or messages occurring and received on the portable communication device and the real time physical positions, the real time audio, and the real time video are provided as live feeds to authorized third parties via telecasting, and wherein a particular real time physical position captured automatically triggers a real-time satellite to capture independent visual inspection of a specific area surrounding the particular real time physical position.

2. The portable communication device of claim 1 further comprising, a global positioning satellite (GPS) receiver integrated into the portable communication device and interfaced to the panic service to supply the real time physical positions of the portable communication device.

3. The portable communication device of claim 1 further comprising, a hidden button that when activated by an operator triggers the agent to process the panic service on the portable communication device.

4. The portable communication device of claim 1 further comprising an access code entry mechanism integrated into the portable communication device and interacted with by an operator of the portable communication device to supply an access code that permits an external mobile requestor to view real time audio and real time video of the portable communication device and to view a current physical position of the portable communication device, the agent verifies the access code and permits the operator to set access restrictions on the requestor or to deny the requestor access altogether.

5. The portable communication device of claim 4, wherein the access code entry mechanism is a key input device for receiving key sequences from the operator, or a camera integrated into the portable communication device for receiving retinal scans, facial scans, and/or fingerprint scans of the operator, the key sequences and the scans represent the access code supplied by the operator via the access code entry mechanism.

6. The portable communication device of claim 1, wherein the portable communication device is a cellular phone, a Wifi-enabled phone, and/or a satellite phone.

* * * * *